United States Patent
Capers

(10) Patent No.: US 10,211,657 B2
(45) Date of Patent: Feb. 19, 2019

(54) SMART CONTACTOR FOR BATTERY DISCONNECTION UNIT

(71) Applicant: Frederick Daniel Capers, Oakland, MI (US)

(72) Inventor: Frederick Daniel Capers, Oakland, MI (US)

(73) Assignees: Robert Bosch Battery Systems GmbH, Stuttgart (DE); Robert Bosch GmbH, Stuttgart (DE)

( * ) Notice: Subject to any disclaimer, the term of this patent is extended or adjusted under 35 U.S.C. 154(b) by 244 days.

(21) Appl. No.: 15/223,047

(22) Filed: Jul. 29, 2016

(65) Prior Publication Data

US 2018/0029475 A1 Feb. 1, 2018

(51) Int. Cl.
| | | |
|---|---|---|
| *H02H 7/18* | (2006.01) | |
| *H02J 7/00* | (2006.01) | |
| *B60L 3/04* | (2006.01) | |
| *B60L 11/18* | (2006.01) | |
| *H02H 1/00* | (2006.01) | |

(52) U.S. Cl.
CPC .............. *H02J 7/0031* (2013.01); *B60L 3/04* (2013.01); *B60L 11/1864* (2013.01); *B60L 11/1872* (2013.01); *H02H 1/00* (2013.01); *H02J 7/0026* (2013.01); *B60L 2240/36* (2013.01); *B60L 2240/529* (2013.01)

(58) Field of Classification Search
CPC ........ B60L 3/04; B60L 3/0046; B60L 3/0092; H02H 1/00; H02J 7/0026; H02J 7/0029; H02J 7/0031
USPC ...................................................... 307/10.7
See application file for complete search history.

(56) References Cited

U.S. PATENT DOCUMENTS

| | | | |
|---|---|---|---|
| 4,820,965 A | 11/1989 | Siemer | |
| 6,320,359 B1 * | 11/2001 | Nagaya ............... | H02M 3/1588 323/224 |
| 7,145,313 B2 * | 12/2006 | Geren .................. | H02J 7/0031 320/134 |
| 7,508,091 B2 | 3/2009 | Binder | |
| 9,266,434 B2 | 2/2016 | Girard et al. | |
| 2008/0315683 A1* | 12/2008 | Jabaji ..................... | B60R 16/03 307/10.1 |
| 2014/0252847 A1* | 9/2014 | Yang ...................... | B60R 16/03 307/9.1 |
| 2015/0222117 A1* | 8/2015 | Im ........................ | H02J 7/0019 307/52 |
| 2017/0089104 A1* | 3/2017 | Kowalewski ........... | E05B 81/80 |

* cited by examiner

*Primary Examiner* — Rexford Barnie
*Assistant Examiner* — Rasem Mourad
(74) *Attorney, Agent, or Firm* — Maginot Moore & Beck LLP

(57) ABSTRACT

A switching device comprises a first and second connector, a first and second input, an output, a switch connected between the first connector and the second connector, a current sensor configured to measure a current flowing through the switch, and a controller connected to the current sensor, the switch, the first input, the second input, and the output. The controller is configured to: operate the switch based on a first control signal at the first input; connect the second control signal at the second input to the output; operate the switch to open in response to the current flowing through the switch exceeding a predetermined current limit; and disconnect the second control signal from the output in response to the current flowing through the switch exceeding the predetermined current limit.

17 Claims, 3 Drawing Sheets

SMART CONTACTOR FOR BATTERY DISCONNECTION UNIT

BACKGROUND

The device and method disclosed in this document relates to battery disconnection units and, more particularly, to a smart contactor for a battery disconnection unit.

In high-voltage battery powered systems, such as those of electric and hybrid-electric vehicles, very stringent requirements are placed with respect of reliability, safety, power-carrying capacity and service life. A common requirement is that such systems have a mechanism for emergency shut-off. Emergency shut-off may be required, for example, in the event of system-related faults (short circuit) or in the event of accidents. Prompt disconnection of the battery is often required to prevent fires in the vehicle or damage to the battery in the event of an accident or a short circuit.

Some systems employ a battery disconnection unit that disconnects the battery from the vehicle power system so as to interrupt the flow of current from the battery in the event of an accident or short circuit. A battery system 100 having an exemplary battery disconnection unit (BDU) 104 is shown in FIG. 1. The battery system 100 includes a battery pack 108 having a positive terminal 112 and a negative terminal 116. The battery disconnection unit 104 is connected between the battery pack 108 and the vehicle power system (not shown) and is configured to selectively disconnect the battery pack 108 from the vehicle power system in response to control signals from a battery control unit (BCU) 120.

The battery disconnection unit 104 comprises a high-side contactor 124 and a low-side contactor 128. The high-side contactor 124 is connected between the positive terminal 112 of the battery pack 108 and a positive connector 132 to a positive power line or rail of the vehicle power system. The low-side contactor 128 is connected between the negative terminal 116 of the battery pack 108 and a negative connector 136 to a negative power line or rail of the vehicle power system. The battery control unit 120 is configured to operate the high-side contactor 124 with a high-side control signal 140 to selectively open and close the high-side contactor 124. Similarly, the battery control unit 120 is configured to operate the low-side contactor 128 with a low-side control signal 144 to selectively open and close the low-side contactor 128. In this way, the battery disconnection unit 104 enables disconnection of the battery pack 108 in response to commands from battery control unit 120.

In some circumstances, such as in the event of an accident, a short circuit may be established between the positive and negative power lines of the vehicle power system. If the battery pack 108 remains connected the vehicle power system in such a scenario, substantial current flows from the battery, which generates substantial heat that will not only cause damage to the battery, but potentially cause a fire in the vehicle. To protect against dangerous over-current situations, the battery disconnection unit 104 further includes an oversized fuse 148 connected in series with the high-side contactor 124 and configured to blow in an over-current situation, thereby interrupting the flow of current from the battery pack 108 to the vehicle power system.

Due to the high voltages and currents of the power system 100, the fuse 148 must be very large. Additionally, the fuse 148 must be large to prevent from blowing due to aging (degradation). Among other things, this oversizing of the fuse 148 contributes to increased reaction times for the fuse 148 to blow in an over-current situation. While expected fuse reaction times is still on the order of milliseconds, in the presence of a short circuit, currents can nevertheless increase to over a thousand amps before the fuse actually breaks the over-current. Accordingly, there is a high probability of catastrophic damage to the battery pack 108.

What is needed is a reliable mechanism for prompt disconnection of a battery pack in an over-current situation, which is substantially faster than a traditional battery disconnection unit having oversized fuse. It would also be advantageous if such a mechanism does not increase the complexity of the battery disconnection unit and, preferably, reduces the total parts count for the battery disconnection unit.

SUMMARY

A switching device for a battery disconnection unit in a vehicle battery system is disclosed. The switching device comprises a first connector and a second connector, the first connector being configured to connect to a first terminal of a battery and the second connector being configured to connect to a first power line of a power system; a first input and a second input, the first input being configured to receive a first control signal and the second input being configured to receive a second control signal; an output configured to transmit a third control signal; a switch connected between the first connector and the second connector; a current sensor configured to measure a current flowing through the switch; and a controller connected to the current sensor, the switch, the first input, the second input, and the output. The controller is configured to: operate the switch based on the first control signal at the first input; connect the second control signal at the second input to the output; operate the switch to open in response to the current flowing through the switch exceeding a predetermined current limit; and disconnect the second control signal from the output in response to the current flowing through the switch exceeding the predetermined current limit.

A vehicle battery system having the switching device is disclosed. The vehicle battery system comprises a battery having a positive terminal and a negative terminal; a battery control unit configured to output a first control signal and a second control signal; a contactor connected between the positive terminal of the battery and a positive power line of a vehicle power system; and a switching device connected between the negative terminal of the battery and a negative power line of the vehicle power system. The switching device comprises: a first connector and a second connector, the first connector being connected to the negative terminal of the battery and the second connector being connected to the negative power line of the vehicle power system; a first input and a second input, the first input being connected to receive the first control signal from the battery control unit and the second input being connected to receive the second control signal from the battery control unit; an output operably connected to operate the contactor; a switch connected between the first connector and the second connector; a current sensor configured to measure a current flowing through the switch; and a controller connected to the current sensor, the switch, the first input, the second input, and the output. The controller is configured to: operate the switch based on the first control signal at the first input; connect the second control signal at the second input to the output; operate the switch to open in response to the current flowing through the switch exceeding a predetermined current limit; and disconnect the second control signal from the output in response to the current flowing through the switch exceeding the predetermined current limit.

BRIEF DESCRIPTION OF THE DRAWINGS

The foregoing aspects and other features of a switching device and vehicle battery system are explained in the following description, taken in connection with the accompanying drawings.

DETAILED DESCRIPTION

Figure 1:
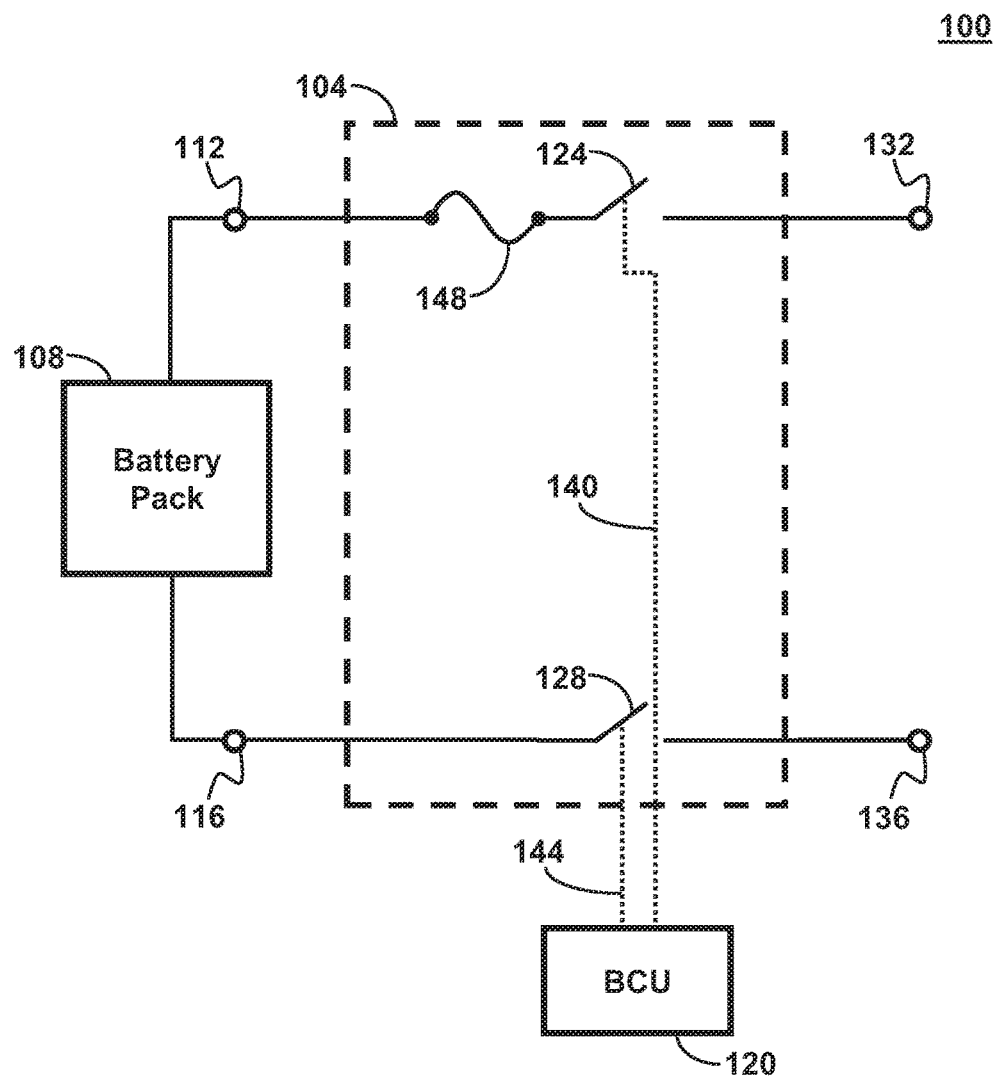
FIG. 1 is a schematic diagram of a prior art battery system having a battery disconnection unit.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
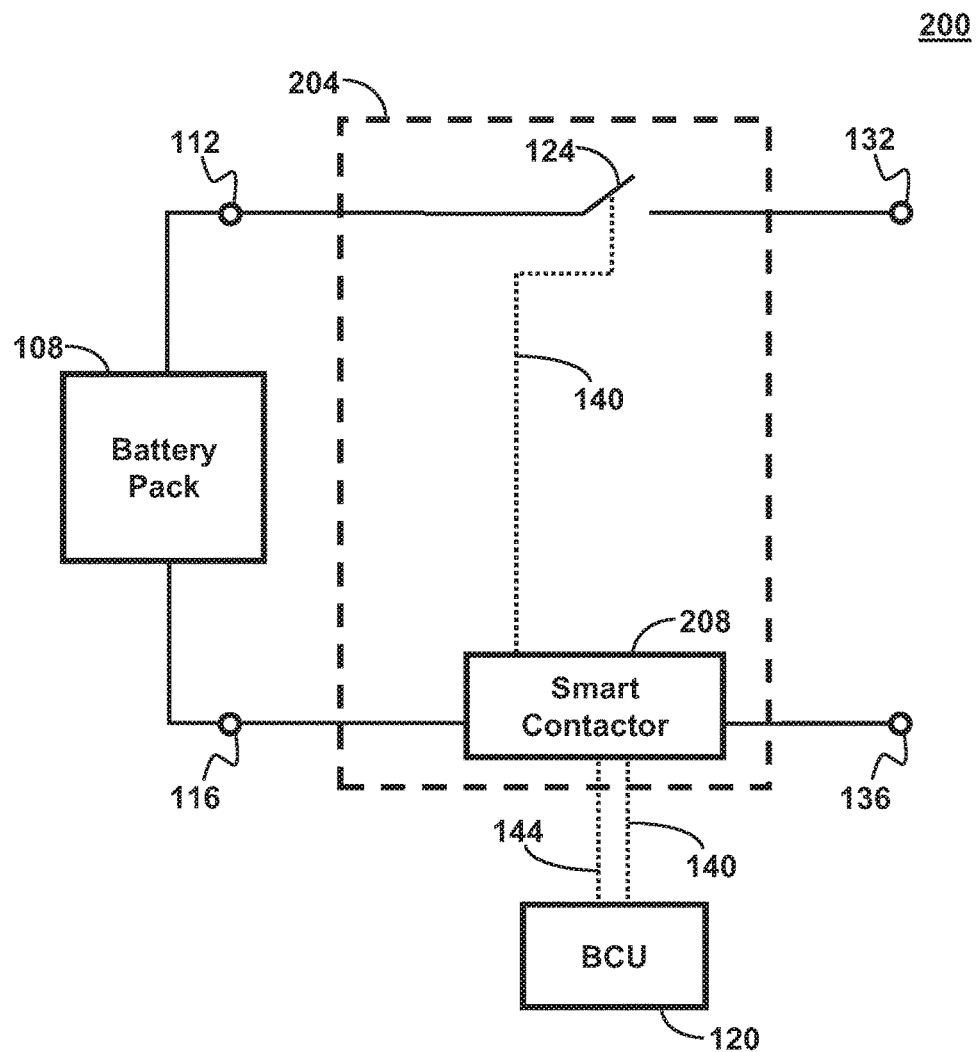
FIG. 2 is a schematic diagram of a battery system having a battery disconnection unit.

FIG. 2 depicts a battery system 200 having a battery disconnection unit 204. The battery system 200 is similar to the battery system 100 and common components are labeled according to the labels of the FIG. 1. In the battery system 200 is different from the battery system 100 in that the fuse 148 and the low-side contactor 128 have been eliminated from the circuit. Instead, the battery system 200 includes a smart contactor 208.

The smart contactor 208 is a solid state device configured to operate as a switching device in place of one of the contactors of a traditional battery disconnection unit. In the embodiment shown, the smart contactor 208 is connected between the negative terminal 116 of the battery pack 108 and the negative connector 136 to the negative power line of the vehicle power system. In other words, the smart contactor 208 is arranged in substitution of the low-side contactor 128. However, in other embodiments, the smart contactor 208 may be arranged in substitution of the high-side contactor 124.

The smart contactor 208 is configured to receive as inputs the high-side control signal 140 and the low-side control signal 144 from the battery control unit 120. In a normal operating state, the smart contactor 208 is configured to operate as a switching device in accordance with the low-side control signal 144. Particularly, in one embodiment, the smart contactor 208 is configured to operate in a closed state to allow current to flow through the smart contactor 208 in response to the low-side control signal 144 being high. Conversely, the smart contactor 208 is configured to operate in an open state to prevent current from flowing in response to the low-side control signal 144 being low. Additionally, in the normal operating state, the smart contactor 208 is configured to provide a pass-through of the high-side control signal 140 as an output to the high-side contactor 124, as discussed in more detail below. It is noted that, in embodiments in which the smart contactor 208 is arranged in substitution of the high-side contactor 124, the smart contactor operates in accordance with the high-side control signal 140 and provides a pass-through of the low-side control signal 144 as an output to the low-side contactor 128.

In addition to operating as a switching device, the smart contactor 208 is configured to monitor a current flowing through the battery pack 108 in order to detect over-current situations, such as those caused by a short circuit in the vehicle power system. In one embodiment, the smart contactor 308 is configured to, in response to the current flowing through the battery pack 108 exceeding a predetermined current limit, transition into an emergency state in which the smart contactor 208 disconnects the battery pack 208. Particularly, in response to the current flowing through the battery pack 108 exceeding the predetermined current limit, the smart contactor 208 is configured to operate in an open state to prevent current from flowing and to interrupt the pass-through of the high-side control signal 140 to the high-side contactor 124. In this way, if an over-current situation occurs the battery pack 108 is disconnected at both the positive and negative battery terminals 112, 116.

In one embodiment, the smart contactor 208 is further configured to monitor a temperature in order to detect over-temperature situations. In one embodiment, the smart contactor 308 is configured to, in response to the temperature exceeding a predetermined temperature limit, transition into the emergency state in which the smart contactor 208 disconnects the battery pack 208. Particularly, in response to the temperature exceeding the predetermined temperature limit, the smart contactor 208 is configured to operate in an open state to prevent current from flowing and to interrupt the pass-through of the high-side control signal 140 to the high-side contactor 124.

In one embodiment, after the smart contactor 208 has responded to the over-current situation or to the over-temperature situation and is in the emergency state, the smart contactor 208 is configured to reset to the normal operating state in response to the low-side control signal 144 being low, i.e. an open command from the BCU 120.

Figure 3:
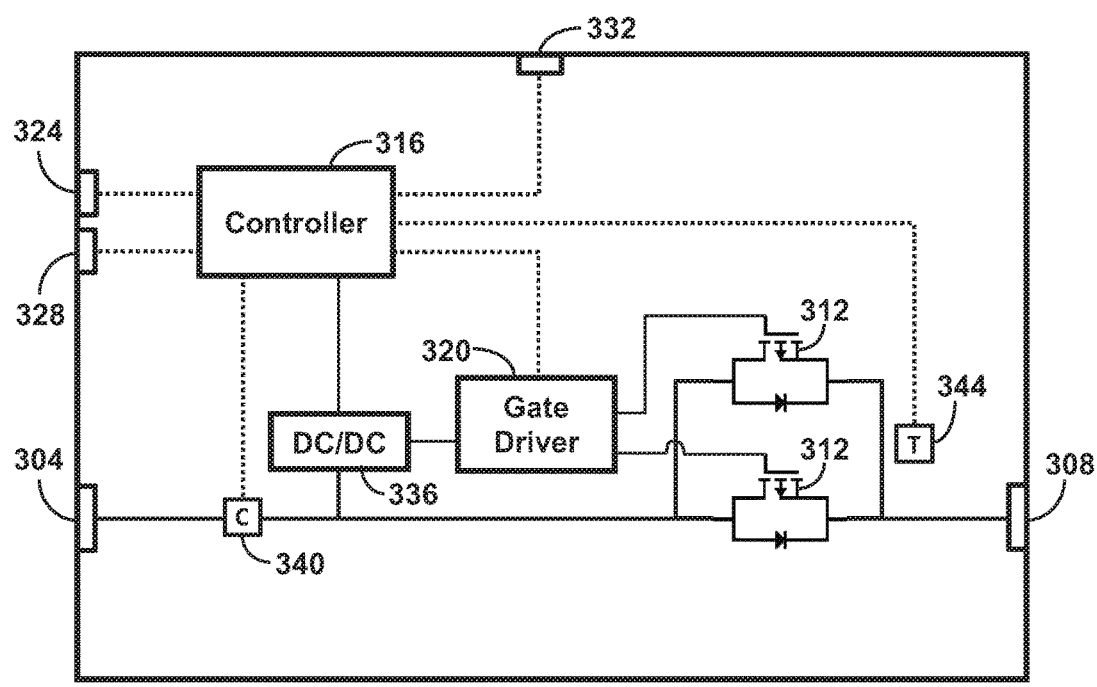
FIG. 3 is a schematic diagram of a smart contactor.

FIG. 3 shows smart contactor 300, which is one possible embodiment of the smart contactor 208. The smart contactor 300 includes a first connector 304 and a second connector 308, which serve as the primary connections for implementing the switching functionality of the smart contactor 300. The smart contactor 300 includes at least one switch connected between first connector 304 and the second connector 308. In the particular embodiment shown, the smart contactor 300 includes a pair of power MOSFETs 312 arranged in parallel with one another and connected between the first connector 304 and the second connector 308. In one embodiment, the MOSFETs 312 have body-diodes. The MOSFETs 312 preferably have a low on-state resistance $R_{ds}$. The parallel arrangement of the MOSFETs 312 enables the smart contactor 300 to a have decreased on-state resistance, as well as lower power loss. In other embodiments, the smart contactor 300 can instead comprise other types of power electronics switches such as thyristors, IGBT, relays, or contactors.

Depending on the type of switches used and how the switches are arranged, the smart contactor 300 may or may not be bi-directional in its switching functionally. Particularly, in an embodiment in which the MOSFETs 312 are power MOSFETs having body diodes, the smart contactor 300 will only block current from flowing in one direction. As shown, the MOSFETs 312 are configured to selectively block current from flowing from the second connector 308 to the first connector 304. However, the body-diodes of the MOSFETs 312 will enable current to flow from the first connector 304 to the second connector 308. Accordingly, in this arrangement, the smart contactor 300 can be suitably arranged in substitution of a low-side contactor by connecting the first connector 304 to a negative terminal of a battery. A person having ordinary skill in the art will appreciate that alternative switch arrangements can enable bi-directional switching and/or enable substitution of a high-side contactor.

The smart contactor 300 includes a controller 316 configured to operate the MOSFETs 312. The controller 316 may be any of various controllers, processors, programmable logic devices, integrated circuits, etc. as will be recognized by those of ordinary skill in the art. Additionally, the controller 316 is operably connected to selectively control an open/closed state of the MOSFETs 312. In one embodiment, the smart contactor 300 includes an isolated gate driver 320 configured to provide driving voltages to the gates of the MOSFETs 312. The controller 316 is connected to the gate driver 320 and configured to provide control signals to the gate driver 320 for operating the MOSFETs 312. In other embodiments, the controller 316 is configured to provide driving voltages to the MOSFETs 312 directly.

The smart contactor 300 further includes a high-side control input 324 and a low-side control input 328, which are connected to the control 316. The high-side control input 324 is configured to receive a high-side control signal (e.g. the high-side control signal 140) intended for controlling a high-side switch (e.g. the high-side contactor 124) of a battery disconnection unit. Similarly, the low-side control input 328 is configured to receive a low-side control signal (e.g. the low-side control signal 144) intended for controlling a low-side switch (e.g. the low-side contactor 128) of a battery disconnection unit.

In a normal operating state, the controller 316 is configured to operate the MOSFETs 312 in accordance with a signal provided at the low-side control input 328 (e.g. the low-side control signal 144). Particularly, in one embodiment, the controller 316 is configured to operate the MOSFETs 312 to close in response to the signal at the low-side control input 328 being high, thereby enabling current to flow from the second connector 308 to the first connector 304. Conversely, the controller 316 is configured to operate the MOSFETs 312 to open in response to the signal at the low-side control input 328 being low, thereby preventing current from flowing from the second connector 308 to the first connector 304.

The smart contactor 300 further includes a high-side control output 332, which is connected to the controller 316. The output 332 is configured provide a control signal for controlling a high-side switch (e.g. the high-side contactor 124). In the normal operating state, the high-side control output 332 acts as a pass-through for a signal provided at the high-side control input 324 (e.g. the high-side control signal 140). Particularly, in the normal operating state, the controller 316 is configured to connect the signal provided at the high-side control input 324 to the high-side control output 332. In one embodiment, the controller 316 operates a switch (not shown) that selectively connects the high-side control input 324 to the high-side control output 332. In other embodiments, the controller 316 simply provides the pass-through using internal logic thereof.

In one embodiment, the smart contactor includes DC/DC converter 336 configured to provide power to the controller 316 and the gate driver 320. The converter 336 is connected to one of the first connector 304 and the second connector 308 (whichever connector is to be attached to a battery terminal) and configured to receive a DC voltage from a battery connected to the smart contactor 300 (e.g. the battery pack 108). In one embodiment, the converter 336 is configured to convert relatively higher voltages from the battery into to relatively lower voltages suitable for operation of the controller 316 and the gate driver 320.

The smart contactor 300 is further configured to monitor for over-current situations in the battery system. Particularly, the smart contactor 300 includes a current sensor 340. The current sensor 340 is connected to the controller 316 and configured to measure a current that is flowing between the connector 304 and the connector 308 (e.g. a current flowing through the battery pack 108). The controller 316 is configured to receive a current measurement from the current sensor 340 and detect if the current exceeds a predetermined temperature limit indicating an over-current situation.

In response to the current flowing between the connector 304 and the connector 308 exceeding a predetermined current limit, the smart contactor 300 enters an emergency state in which current is prevented from flowing and the pass-through of the high-side control signal is interrupted. Particularly, in response to the current exceeding the predetermined current limit, the controller 316 is configured to operate the MOSFETs 312 to open, thereby preventing current from flowing from the second connector 308 to the first connector 304. Additionally, the controller 316 is configured to interrupt the pass-through of the signal provided at the high-side control input 324 to the high-side control output 332. Particularly, in one embodiment, the controller 316 operates a switch (not shown) to disconnect the high-side control input 324 from the high-side control output 332. Alternatively, the controller 316 is configured to simply provide a logical zero or low voltage to the high-side control output 332 using logic thereof.

In one embodiment, the smart contactor 300 is further configured to monitor for over-temperature situations in the battery system. Particularly, in one embodiment, the smart contactor 300 includes a temperature sensor 344. The temperature sensor 344 is connected to the controller 316 and configured to measure a temperature. In one embodiment the temperature sensor 344 is arranged near the MOSFETs 312 and is configured to measure a temperature of the MOSFETs 312. The controller 316 is configured to receive a temperature measurement from the temperatures sensor 344 and detect if the temperature exceeds a predetermined temperature limit indicating an over-temperature situation.

In response to the temperature exceeding the predetermined temperature limit, the smart contactor 300 enters the emergency state in which current is prevented from flowing and the pass-through of the high-side control signal is interrupted. Particularly, in response to the temperature exceeding the predetermined temperature limit, the controller 316 is configured to operate the MOSFETs 312 to open, thereby preventing current from flowing from the second connector 308 to the first connector 304. Additionally, the controller 316 is configured to interrupt the pass-through of the signal provided at the high-side control input 324 to the high-side control output 332. Particularly, in one embodiment, the controller 316 operates a switch (not shown) to disconnect the high-side control input 324 from the high-side control output 332. Alternatively, the controller 316 is configured to simply provide a logical zero or low voltage to the high-side control output 332 using logic thereof.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A switching device comprising:
   a first connector and a second connector, the first connector being configured to connect to a first terminal of a battery and the second connector being configured to connect to a first power line of a power system;
   a first input and a second input, the first input being configured to receive a first switch control signal from a battery control unit and the second input being configured to receive a second switch control signal from the battery control unit, the first switch control signal and the second switch control signal each selectively commanding one of an open switch state and closed switch state;
   an output configured to operably connect to a contactor that is connected between a second terminal of the battery and a second power line of the power system, the contactor being operated via the output;
   a switch connected between the first connector and the second connector;
   a current sensor configured to measure a current flowing through the switch; and
   a controller operatively connected to the current sensor, the switch, the first input, the second input, and the output, the controller being configured to:
      operate the switch based on the first switch control signal at the first input;
      pass through the second switch control signal from the second input to the output;
      operate the switch to open in response to the current flowing through the switch exceeding a predetermined current limit; and
      interrupt the pass through of the second switch control signal to the output in response to the current flowing through the switch exceeding the predetermined current limit.

2. The switching device of claim 1 further comprising:
   a temperature sensor configured to measure a temperature of the switch; and
   the controller being connected to the temperature sensor and further configured to:
      operate the switch to open in response to the temperature of the switch exceeding a predetermined temperature limit; and
      interrupt the pass through of the second switch control signal to the output in response to the temperature of the switch exceeding the predetermined temperature limit.

3. The switching device of claim 1, the controller being further configured to:
   after operation of the switch to open in response to the current flowing through the switch exceeding a predetermined current limit, resume operation of the switch based on the first switch control signal at the first input in response to a first switch control signal having a logical zero value; and
   after operation of the switch to open in response to the current flowing through the switch exceeding a predetermined current limit, resume the pass through of the second switch control signal to the output in response to a first switch control signal having a logical zero value.

4. The switching device of claim 1, the switch further comprising:
   a field-effect transistor.

5. The switching device of claim 4, the switch further comprising:
   at least two field-effect transistors arranged in parallel.

6. The switching device of claim 1 further comprising:
   a DC/DC converter connected to the first connector and to the controller, the DC/DC converter being configured to provide power to the controller by converting a DC voltage at the first connector into a DC voltage for the controller.

7. The switching device of claim 1 further comprising:
   a driver circuit connected to the switch and to the controller, the driver circuit being configured to:
      receive a control signal from the controller; and
      operate the switch to open and close based on the received control signal from the controller.

8. The switching device of claim 1, further comprising:
   a housing configured to enclose the switch, the current sensor, and the controller, the first connector and the second connector being arranged on the housing.

9. The switching device of claim 1, wherein the first connector is configured to connect to a negative terminal of a vehicle battery and the second connector is configured to connect to a negative power line of a vehicle power system.

10. A vehicle battery system comprising:
    a battery having a first terminal and a second terminal;
    a battery control unit configured to output a first switch control signal and a second switch control signal, the first switch control signal and the second switch control signal each selectively commanding one of an open switch state and closed switch state;
    a contactor connected between the first terminal of the battery and a first power line of a vehicle power system; and
    a switching device connected between the second terminal of the battery and a second power line of the vehicle power system, the switching device comprising:
       a first connector and a second connector, the first connector being connected to the second terminal of the battery and the second connector being connected to the second power line of the vehicle power system;
       a first input and a second input, the first input being connected to receive the first switch control signal from the battery control unit and the second input being connected to receive the second switch control signal from the battery control unit;
       an output operably connected to operate the contactor;
       a switch connected between the first connector and the second connector;
       a current sensor configured to measure a current flowing through the switch; and
       a controller connected to the current sensor, the switch, the first input, the second input, and the output, the controller being configured to:
          operate the switch based on the first switch control signal at the first input;
          pass through the second switch control signal from the second input to the output;
          operate the switch to open in response to the current flowing through the switch exceeding a predetermined current limit; and
          interrupt the pass through of the second switch control signal to the output in response to the current flowing through the switch exceeding the predetermined current limit.

11. The vehicle battery system of claim 10, the switching device further comprising:
   a temperature sensor configured to measure a temperature of the switch; and
   the controller being connected to the temperature sensor and further configured to:
      operate the switch to open in response to the temperature of the switch exceeding a predetermined temperature limit; and
      interrupt the pass through of the second switch control signal to the output in response to the temperature of the switch exceeding the predetermined temperature limit.

12. The vehicle battery system of claim 10, the controller being further configured to:
   after operation of the switch to open in response to the current flowing through the switch exceeding a predetermined current limit, resume operation of the switch based on the first switch control signal at the first input in response to a first switch control signal having a logical zero value; and
   after operation of the switch to open in response to the current flowing through the switch exceeding a predetermined current limit, resume the pass through of the second switch control signal to the output in response to a first switch control signal having a logical zero value.

13. The vehicle battery system of claim 10, the switch further comprising:
   a field-effect transistor.

14. The vehicle battery system of claim 13, the switch further comprising:
   at least two field-effect transistors arranged in parallel.

15. The vehicle battery system of claim 10, the switching device further comprising:
   a DC/DC converter connected to the first connector and to the controller, the DC/DC converter being configured to provide power to the controller by converting a DC voltage at the first connector into a DC voltage for the controller.

16. The vehicle battery system of claim 10, the switching device further comprising:
   a driver circuit connected to the switch and to the controller, the driver circuit being configured to:
      receive a control signal from the controller; and
      operate the switch to open and close based on the received control signal from the controller.

17. The vehicle battery system of claim 10, the switching device further comprising:
   a housing configured to enclose the switch, the current sensor, and the controller, the first connector and the second connector being arranged on the housing.

* * * * *